(12) United States Patent
Bang et al.

(10) Patent No.: US 8,013,480 B2
(45) Date of Patent: Sep. 6, 2011

(54) LINEAR VIBRATION MOTOR

(75) Inventors: Je Hyun Bang, Gyunggi-do (KR); Hwa Young Oh, Gyunggi-do (KR); Kwang Hyung Lee, Gyunggi-do (KR)

(73) Assignee: Samsung Electro-Mechanics Co., Ltd., Suwon (JP)

( * ) Notice: Subject to any disclaimer, the term of this patent is extended or adjusted under 35 U.S.C. 154(b) by 169 days.

(21) Appl. No.: 12/588,358

(22) Filed: Oct. 13, 2009

(65) Prior Publication Data

US 2010/0231060 A1   Sep. 16, 2010

(30) Foreign Application Priority Data

Mar. 16, 2009   (KR) .......................... 10-2009-0022049

(51) Int. Cl.
*H02K 41/02*   (2006.01)
(52) U.S. Cl. ................ 310/12.25; 310/12.27; 310/12.33
(58) Field of Classification Search .... 310/12.25–12.27, 310/12.31, 12.33
See application file for complete search history.

(56) References Cited

U.S. PATENT DOCUMENTS

| | | | | |
|---|---|---|---|---|
| 6,853,100 | B2 * | 2/2005 | Yumita | 310/12.24 |
| 7,443,058 | B2 * | 10/2008 | Shimizu et al. | 310/12.04 |
| 7,474,018 | B2 * | 1/2009 | Shimizu et al. | 310/12.22 |
| 7,859,144 | B1 * | 12/2010 | Sahyoun | 310/15 |
| 2004/0130221 | A1 * | 7/2004 | Ichii et al. | 310/12 |
| 2005/0184601 | A1 * | 8/2005 | Kweon et al. | 310/36 |
| 2011/0018364 | A1 * | 1/2011 | Kim et al. | 310/17 |
| 2011/0018365 | A1 * | 1/2011 | Kim et al. | 310/17 |

FOREIGN PATENT DOCUMENTS

KR   10-2005-0083528   8/2005
KR   10-0720197   5/2007

OTHER PUBLICATIONS

Korean Office Action issued on Aug. 26, 2010 in corresponding Korean Patent Application 10-2009-0022049.

* cited by examiner

*Primary Examiner* — Thanh Lam (57) ABSTRACT

A linear vibration motor according to an aspect of the invention may include: a case having a cavity to receive a mass therein; a movable part generating a magnetic field inside the case and moving in a transverse direction while being secured to the mass; a coil part generating a force, by which the mass performs a linear reciprocating motion, by interaction with the magnetic field generated from the movable part upon receiving power; and a support plate dividing the cavity in which the coil part is mounted to face the movable part.

12 Claims, 7 Drawing Sheets

LINEAR VIBRATION MOTOR

CROSS-REFERENCE TO RELATED APPLICATIONS

This application claims the priority of Korean Patent Application No. 10-2009-0022049 filed on Mar. 16, 2009, in the Korean Intellectual Property Office, the disclosure of which is incorporated herein by reference.

BACKGROUND OF THE INVENTION

1. Field of the Invention

The present invention relates to a linear vibration motor, and more particularly, to a linear vibration motor that vibrates in the transverse direction within a mobile terminal to thereby reduce the thickness of the mobile terminal.

2. Description of the Related Art

In general, vibration motors convert electrical energy into mechanical vibrations by generating an electromagnetic force. Vibration motors have gradually been reduced in size and weight. These smaller vibration motors are mounted in mobile terminals and provide silent incoming call alerts and various vibration functions.

Touch screen LCDs have been employed for the purposes of size reduction and high quality of mobile terminals. Increasing emphasis has been placed on improving vibration motors. For example, when a user touches a touch screen, a mobile phone will vibrate.

In recent years, linear vibration motors have been used to allow touch screen phones to vibrate. Linear vibration motors are not based on the rotation principle of motors. However, linear vibration motors are driven by an electromagnetic force with resonance frequency determined using a spring provided within the vibration motor and a mass hanging from the spring to thereby generate vibrations.

Here, the electromagnetic force is generated through interaction between a magnet located on the moving mass, and a coil part located at a position corresponding to the magnet and supplying a current having a predetermined frequency.

The linear vibration motor is designed to generate vibrations in a direction perpendicular to the LCD screen. However, in case the linear vibration motor vibrates in the vertical direction, the linear vibration motor can generate vibrations when the mass moves while ensuring vertical displacement. This limits the thickness of the mobile terminal.

That is, when the terminal has the reduced thickness, the amount of vibration being generated from the linear vibration motor may not increase.

SUMMARY OF THE INVENTION

An aspect of the present invention provides a linear vibration motor that has a coil part provided on a support plate dividing a cavity of a case so that a mass within the cavity moves in the transverse direction to generate vibrations, and a movable part facing the coil part and secured to the mass and causing the mass to move in the transverse direction in conjunction with the coil part.

According to an aspect of the present invention, there is provided a linear vibration motor including: a case having a cavity to receive a mass therein; a movable part generating a magnetic field inside the case and moving in a transverse direction while being secured to the mass; a coil part generating a force, by which the mass performs a linear reciprocating motion, by interaction with the magnetic field generated from the movable part upon receiving power; and a support plate dividing the cavity in which the coil part is mounted to face the movable part.

The linear vibration motor may further include an elastic member interposed between the case and the mass and controlling the horizontal displacement of the mass moving in the transverse direction.

The elastic member may be a coil spring, a torsion spring or a plate spring.

The mass may be separated into two parts on the basis of the support plate, the movable part and a connection member may be connected and fixed at the top and bottom of the mass, respectively, and the support plate may be arranged between the movable part and the connection member.

The mass may be separated into two parts on the basis of the support plate, a connection member and the movable part may be connected and fixed at the top and bottom of the mass, respectively, and the support plate may be arranged between the movable part and the connection member.

The elastic member may be a coil spring, and the coil spring may have a large enough diameter to make contact between the movable part and the connection member.

The mass may be separated into two parts on the basis of the support plate, and a connection member may be connected and fixed at the top or bottom of the mass, and the movable part may be arranged on the connection member.

The movable part may include: magnets generating magnetic flux; and a yoke collecting the magnetic flux generated from the magnets being arranged on the yoke at predetermined intervals.

The movable part may be arranged above or under the support plate and fixed to the mass, and the coil part may be arranged on the top or bottom of the support plate and faces the movable part.

The support plate may include non-magnetic materials.

A flexible substrate may be arranged on the support plate so as to supply power to the coil part from an external source.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
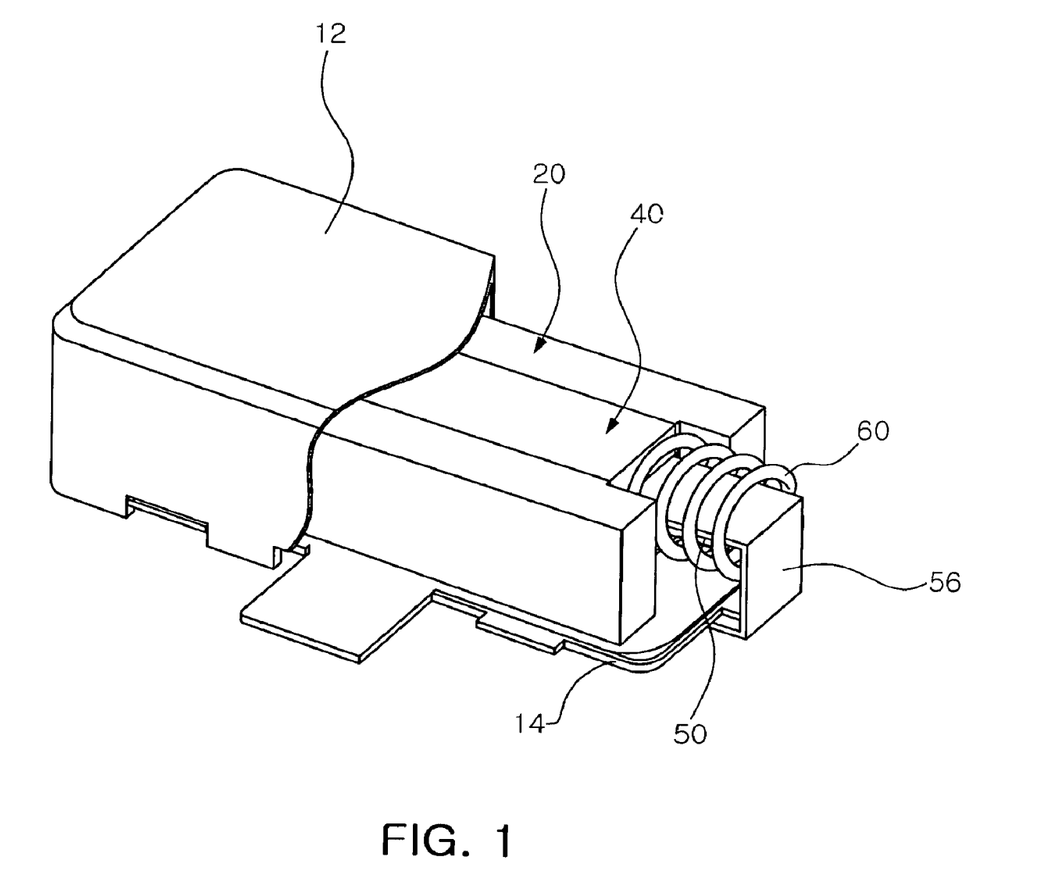
FIG. 1 is a partially exploded view illustrating a linear vibration motor according to an exemplary embodiment of the present invention.
Figure 2:
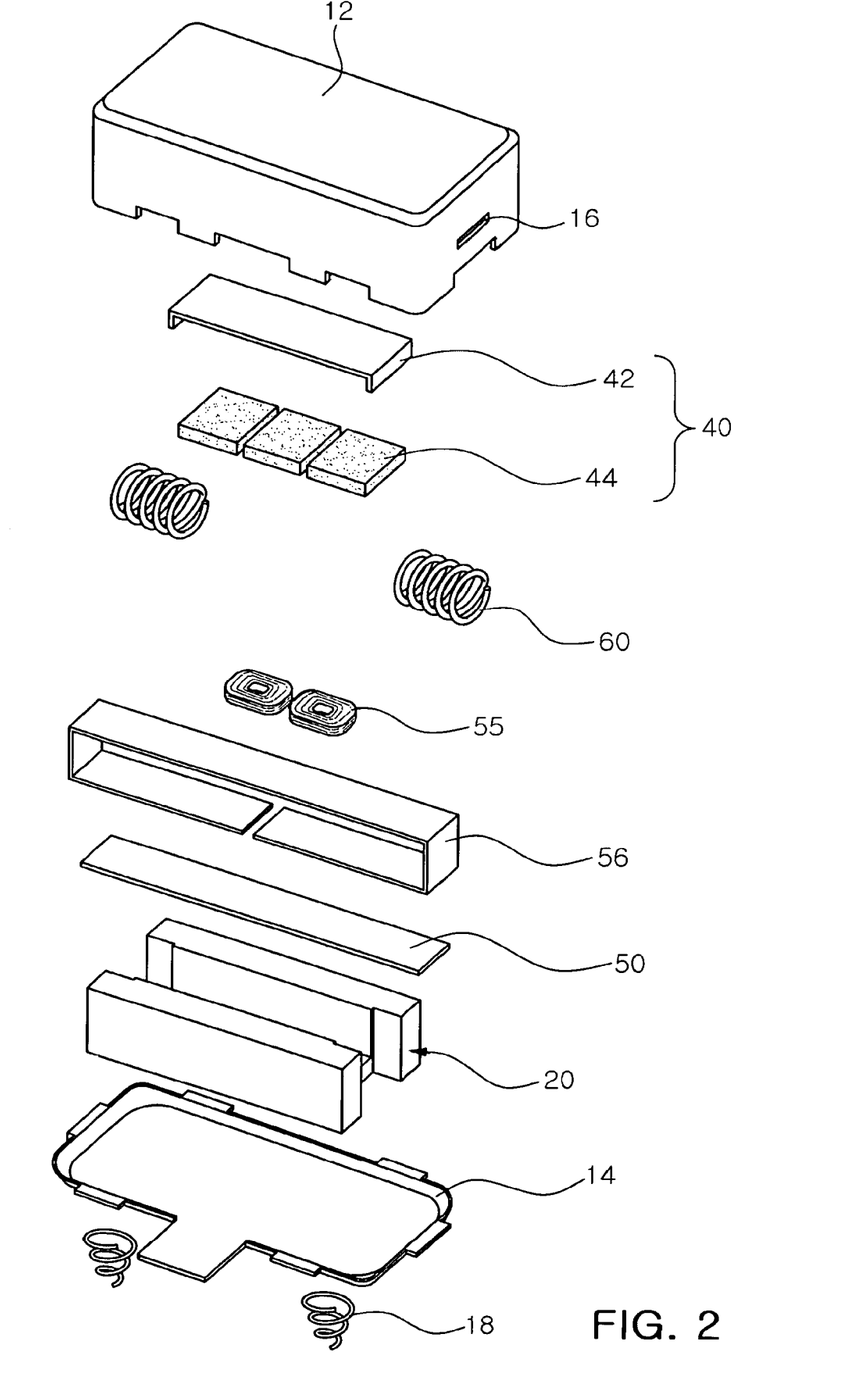
FIG. 2 is an exploded perspective view illustrating a linear vibration motor according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components FIG. 1 is a partially exploded view illustrating a linear vibration motor according to an exemplary embodiment of the invention. FIG. 2 is an exploded perspective view illustrating a linear vibration motor according to an exemplary embodiment of the invention.

Figure 3:
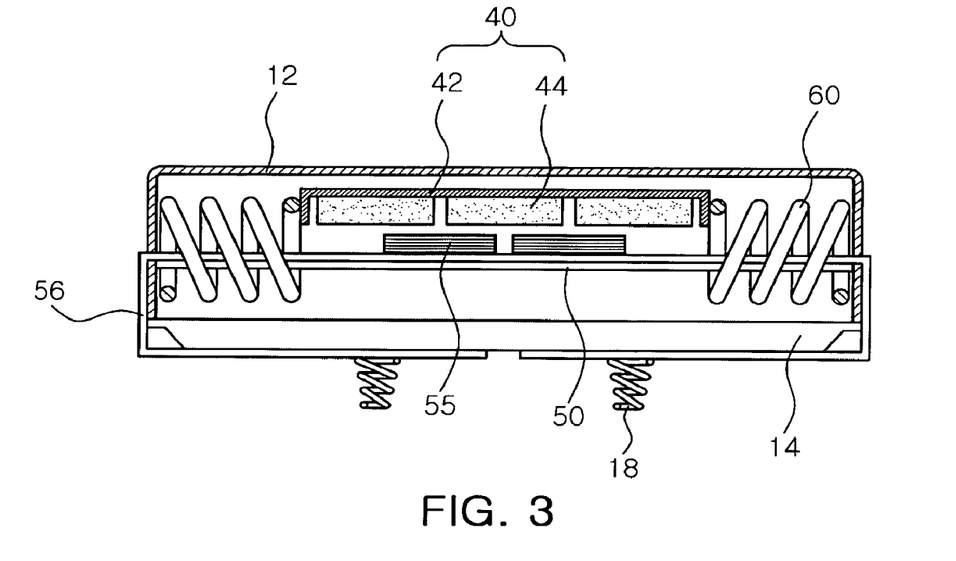
FIG. 3 is a schematic cross-sectional view illustrating the internal structure of a linear vibration motor from which a mass is removed according to an exemplary embodiment of the present invention.
Figure 4:
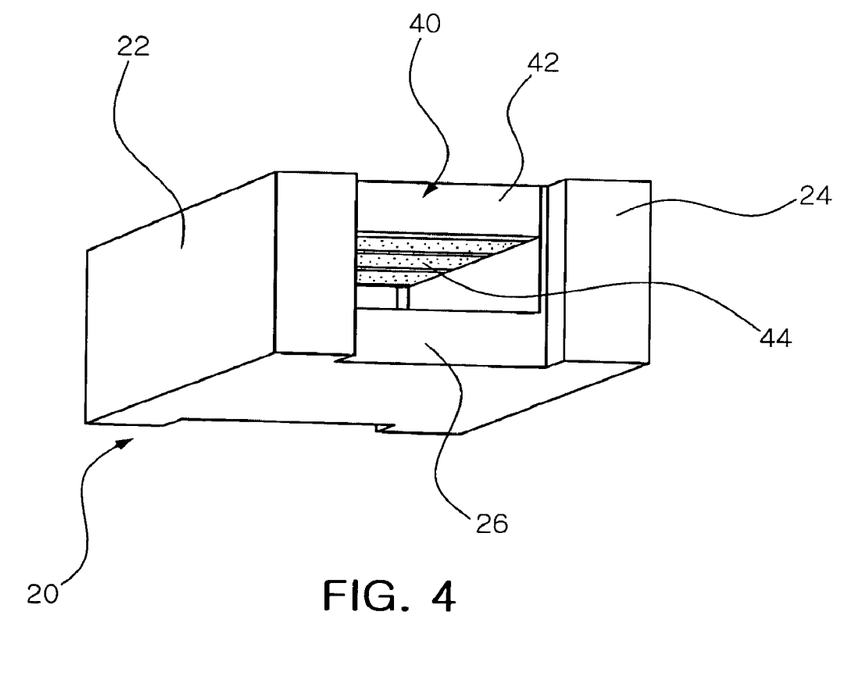
FIG. 4 is a schematic perspective view illustrating a mass and a movable part according to an exemplary embodiment of the present invention.

FIG. 3 is a schematic cross-sectional view illustrating the internal structure of a linear vibration motor from which a mass is removed according to an exemplary embodiment of the invention. FIG. 4 is a schematic perspective view illustrating a mass and a movable part according to an exemplary embodiment of the invention.

Figure 5:
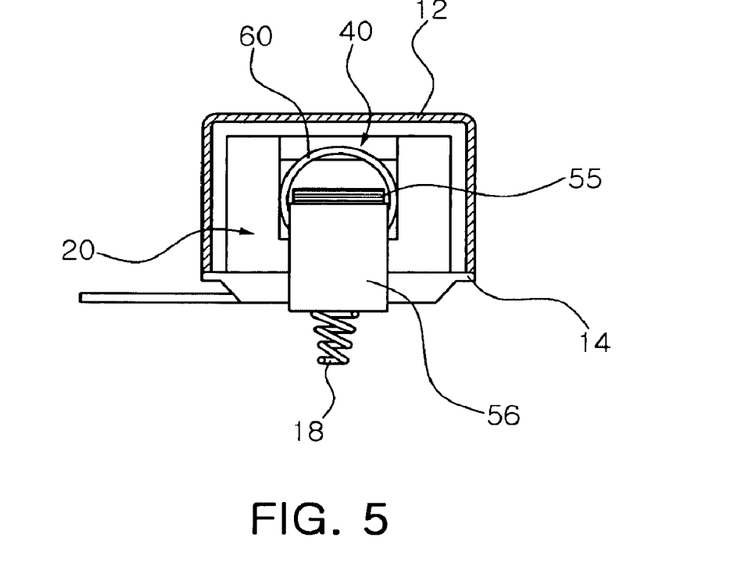
FIG. 5 is a side cross-sectional view schematically illustrating a linear vibration motor according to an exemplary embodiment of the present invention.
Figure 6:
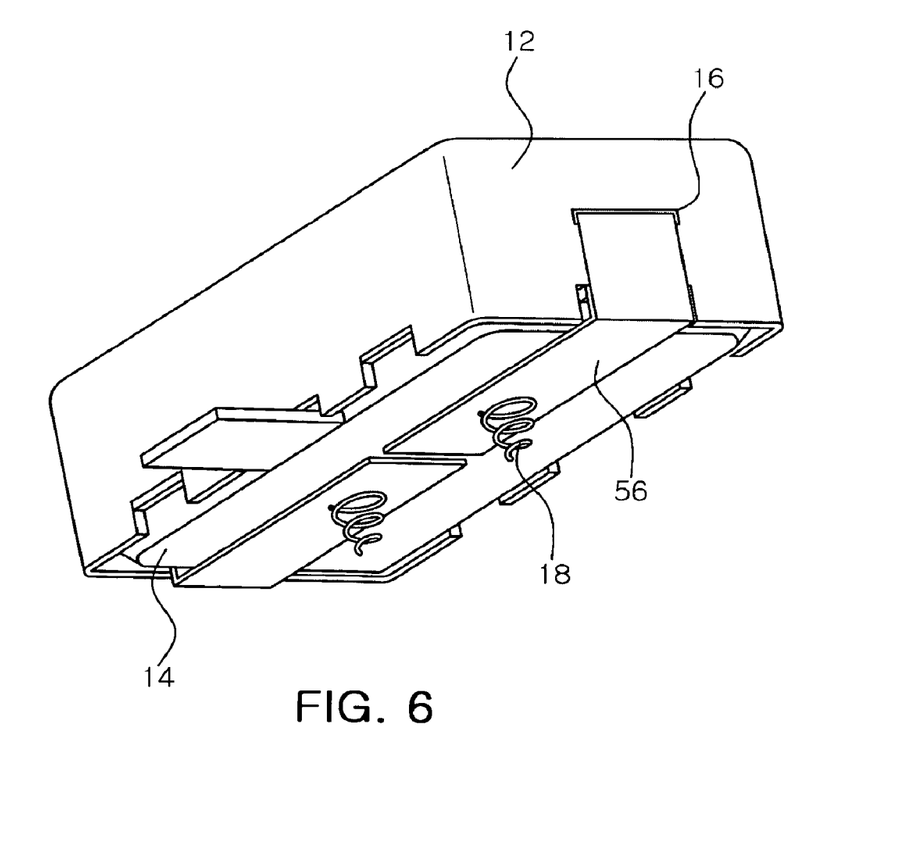
FIG. 6 is a bottom perspective view illustrating a linear vibration motor according to an exemplary embodiment of the invention.

FIG. 5 is a side cross-sectional view schematically illustrating a linear vibration motor according to an exemplary embodiment of the invention. FIG. 6 is a bottom perspective view illustrating a linear vibration motor according to an exemplary embodiment of the invention.

Referring to FIGS. 1 through 6, a linear vibration motor according to this embodiment may include a case 12, a movable part 40, a coil part 55 and a support plate 50.

The case 12 has a cavity therein to receive internal components in the cavity. A mass 20 is received in the cavity. An electromagnetic force, generated between the coil part 55 and the movable part 40, allows the mass 20 to move in a transverse direction inside the case 12.

The case 12 may be a rectangular parallelepiped. Here, the direction in which the rectangular parallelepiped has a large length is referred to as the longitudinal direction, while the direction in which it has a short length is referred to as the transverse direction. However, when the case 12 is a cube, the longitudinal direction and the transverse direction are the same.

The longitudinal length of the case 12 may be larger to increase the horizontal displacement of the mass 20.

The movable part 40 generates a magnetic field inside the case 12 and moves in the transverse direction while being secured to the mass 20.

The movable part 40 includes a magnet 44 generating magnetic flux and a yoke 42 collecting the magnetic flux generated from the magnet 44.

The magnet 44 may include one or a plurality of magnets. A plurality of magnets may be placed on the yoke 42 at predetermined intervals.

The cavity of the case 12 may be separated into two parts in the vertical direction by a support plate 50. The two parts, divided by the support plate 50, are not necessarily equal to each other and can vary in design according to the distance between the movable part 40 and the coil part 55.

The movable part 40 and the coil part 55 may include various arrangements while interposing the support plate 50 there between so as to generate an electromagnetic force by which the mass 20 can move in the transverse direction.

Referring to FIG. 3, the movable part 40 is disposed above the support plate 50 and secured to the mass 20. The coil part 55 is arranged on the top of the support plate 50 and faces the movable part 40.

The coil part 55 is arranged on the top of the support plate 50. Here, a plurality of coil parts 55 may be arranged to increase an electromagnetic force generated between the movable part 40 and the coil parts 55.

When AC power is applied to the coil part 55 from an external source, the direction of current flowing through the coil part 55 changes. Here, as the direction of the current changes, the movable part 40 starts to move right and left in the transverse direction. Since the mass 20 is secured to the movable part 40, the mass 20 moves in the transverse direction in conjunction with the movable part 40 that is moving in the transverse direction.

An elastic member 60 is arranged between the case 12 and the mass 20. The elastic member 60 may use a spring such as a coil spring, a torsion spring or a plate spring.

In order to increase utilization of internal space of the case 12, as shown in FIG. 4, the mass 20 is separated into two parts on the basis of the support plate 50 in the case 12. Since the mass 20 has a smaller length than the case 12, the mass 20 can freely move inside the case 12.

Referring to FIG. 4, the movable part 40 and a connection member 26 are connected and fixed at the top and bottom of the mass 20, respectively. Further, the support plate 50 is arranged between the movable part 40 and the connection member 26.

The connection member 26 and the mass 20 may be formed of the same or different material. When the connection member 26 and the mass 20 are formed of the same material, they may form a single body.

The movable part 40 and the connection member 26 may have a smaller length than the longitudinal length of the mass 20 so that a space is formed at both ends of the mass 20 to receive the elastic member 60 therein.

The elastic member 60 may be formed of a coil spring encompassing the support plate 50. Here, the coil spring may have a large enough diameter to make contact with the movable part 40 and the connection member 26.

As the coil spring increases in diameter, points of support between the mass 20 and the elastic member 60 are widened, thereby ensuring the stable movement of the mass 20 in the transverse direction.

Preferably, the support plate 50 may be formed of nonmagnetic materials so as not to be affected by the magnet 44 of the movable part 40 located above the support plate 50. Here, since the magnet 44 is distant from the base 14 formed of magnetic materials while interposing the support plate 50, formed of non-magnetic materials, there between, the magnet 44 may be prevented from moving down toward the base 14.

A flexible substrate 56 may be disposed on the support plate 50 to supply external power to the coil part 55. The linear vibration motor according to this embodiment is connected to an external substrate through a contact spring 18 to receive power from an outer source. The external power, being supplied through the contact spring 18, moves to the coil part 55 of the support plate 50 through the flexible substrate 56.

The flexible substrate 56 is connected to the outside of the case 12 through a substrate passing hole 16 formed in the case 12 at a position corresponding to the support plate 50, and as shown in FIG. 6, extends to the contact spring 18 located under the base 14.

Figure 7:
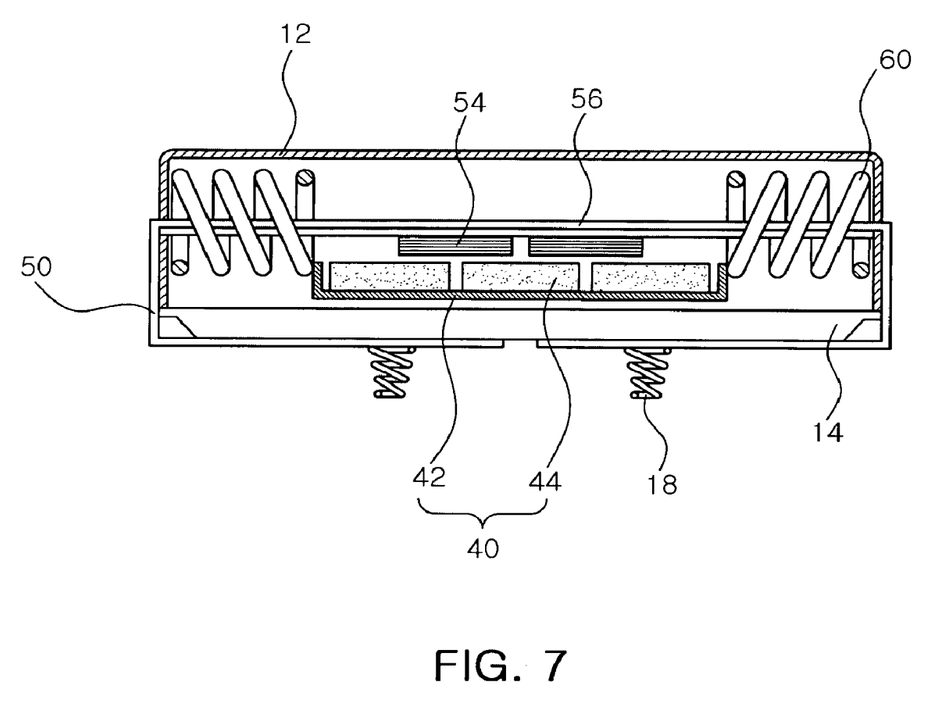
FIG. 7 is a schematic cross-sectional view illustrating the internal structure of a linear vibration motor from which a mass is removed according to another exemplary embodiment of the present invention.
Figure 8:
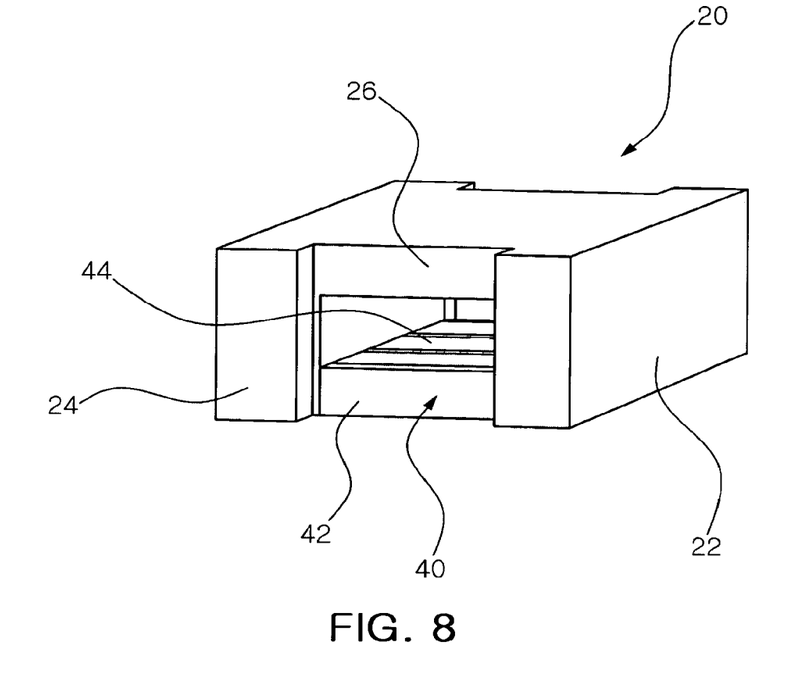
FIG. 8 is a schematic perspective view illustrating a mass and a movable part according to another exemplary embodiment of the present invention.

FIG. 7 is a schematic cross-sectional view illustrating the internal structure of a linear vibration motor from which a mass is removed according to another exemplary embodiment of the invention. FIG. 8 is a schematic perspective view illustrating a mass and a movable part according to another exemplary embodiment of the invention.

Referring to FIGS. 7 and 8, a specific configuration is illustrated in which the coil part 55 is arranged on the bottom of the support plate 50.

A linear vibration motor according to an exemplary embodiment of the invention, shown in FIGS. 7 and 8, is identical to the linear vibration motor, shown in FIGS. 3 and 4, except that the coil part 55 is arranged on the bottom of the support plate 50 and faces the movable part 40.

Therefore, the detailed description of the linear vibration motor according to the embodiment, shown in FIGS. 7 and 8, will be replaced by the description of the linear vibration motor, illustrated with reference to FIGS. 3 and 4.

Figure 9:
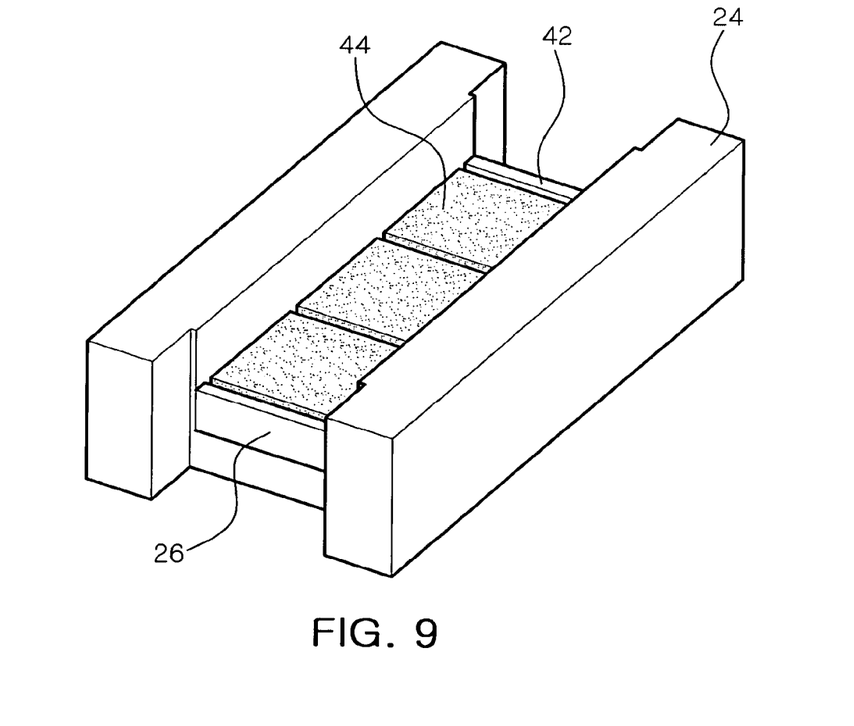
FIG. 9 is a schematic perspective view illustrating a mass and a movable part according another exemplary embodiment of the present invention.

FIG. 9 is a schematic perspective view illustrating a mass and a movable part according another exemplary embodiment of the invention.

Figure 10A:
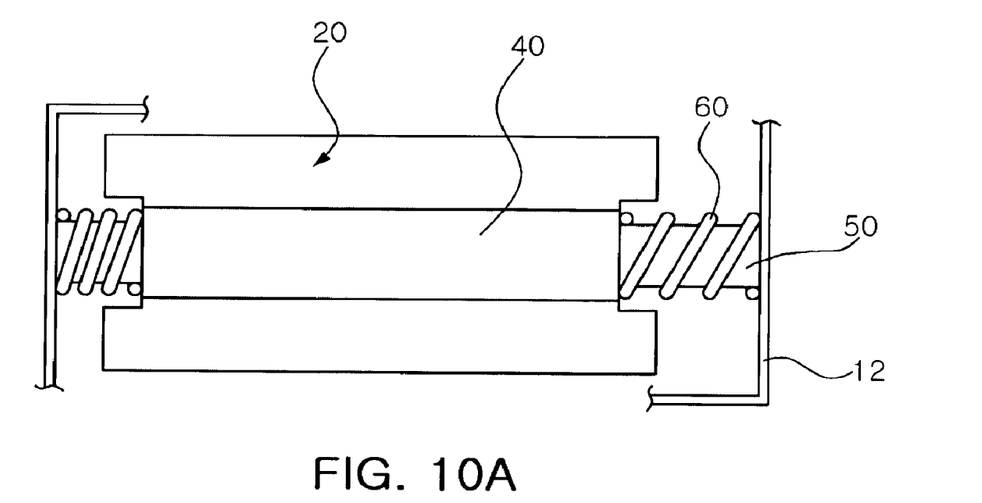
FIGS. 10A and 10B are plan views schematically illustrating a mass of a linear vibration motor performing a linear reciprocating motion inside a case.
Figure 10B:
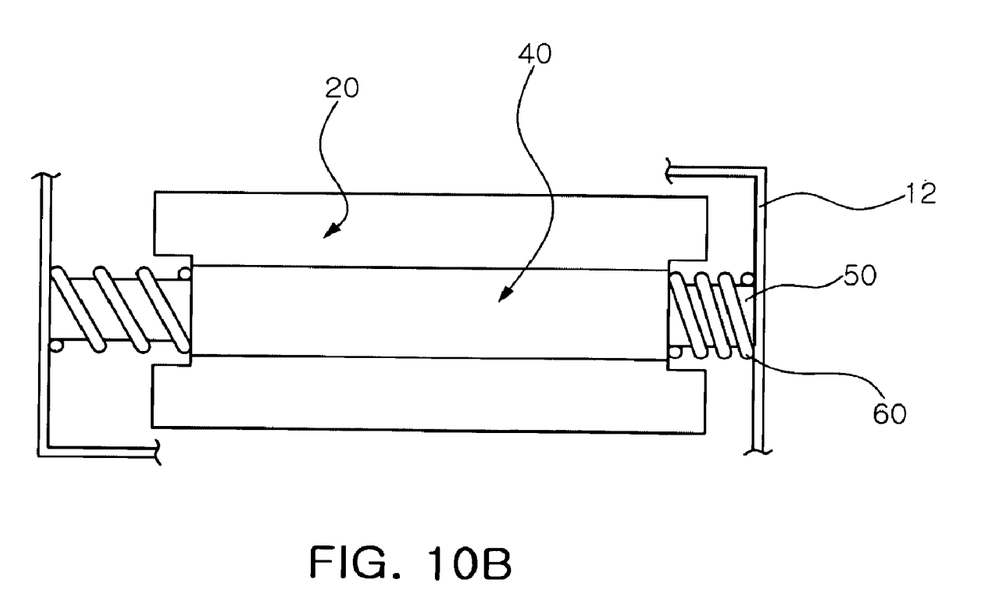

Referring to FIG. 9, the mass 20 of the linear vibration motor, shown in FIG. 9, is separated into two parts on the basis of the support plate 50 (see FIGS. 10A and 10B). The connection member 26 is connected and fixed at the top or bottom of the mass 20, and the movable part 40 is arranged on the connection member 26.

Since the other components of the linear vibration motor, shown in FIG. 9, may be the same or similar components of the above-described embodiments, a detailed description thereof will be omitted. The way in which power is supplied to coils can be easily determined by a person skilled in the art.

FIGS. 10A and 10B are plan views schematically illustrating a mass of a linear vibration motor that performs a linear reciprocating motion within a case.

The movement of a linear vibration motor according to an exemplary embodiment of the invention will be described in brief with reference to FIGS. 10A and 10B. A linear vibration motor generating linear vibration according to an exemplary embodiment of the invention is provided on a board of a mobile phone. Here, power flows along the flexible substrate 56 through the contact spring 18 toward the coil part 55 on the support plate 50.

Here, since AC power is applied as the external power, the direction of current flowing through the coil part 55 is reversed. The movable part 40, to which a force is applied according to the direction of the current flowing through the coil part 55, moves right and left in the transverse direction.

The movement of the movable part 40 causes a movement of the mass 20 secured to the movable part 40. When the mass 20 horizontally moves right and left and alternates between tension and compression, the elastic member 60 transmits vibration to the case 12 and the mobile phone including the case 12.

As set forth above, according to exemplary embodiments of the invention, since a mass of a linear vibration motor generates vibration in a transverse direction, the thickness of the terminal is not limited. Accordingly, the thickness of the terminal can be reduced.

The terminal having the reduced thickness can increase in length to ensure horizontal displacement of the mass, thereby increasing the amount of vibration.

Furthermore, since the mass can be designed to fit the entire space of the case, space utilization can be increased. Since a spring can be arranged inside the mass along the transverse direction, the diameter of the spring can be increased.

In addition, the spring increases in diameter to widen points of support between the mass and the spring, so that the mass can stably move in the transverse direction.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear vibration motor comprising:
a case having a cavity to receive a mass therein;
a movable part generating a magnetic field inside the case and moving in a transverse direction while being secured to the mass;
a coil part generating a force, by which the mass performs a linear reciprocating motion, by interaction with the magnetic field generated from the movable part upon receiving power; and
a support plate dividing the cavity in which the coil part is mounted to face the movable part.

2. The linear vibration motor of claim 1, further comprising an elastic member interposed between the case and the mass and controlling the horizontal displacement of the mass moving in the transverse direction.

3. The linear vibration motor of claim 2, wherein the elastic member is a coil spring, a torsion spring or a plate spring.

4. The linear vibration motor of claim 2, wherein the mass is separated into two parts on the basis of the support plate,
the movable part and a connection member are connected and fixed at the top and bottom of the mass, respectively, and the support plate is arranged between the movable part and the connection member.

5. The linear vibration motor of claim 2, wherein the mass is separated into two parts on the basis of the support plate,
a connection member and the movable part are connected and fixed at the top and bottom of the mass, respectively, and the support plate is arranged between the movable part and the connection member.

6. The linear vibration motor of claim 4, wherein the elastic member is a coil spring, and
the coil spring has a large enough diameter to make contact between the movable part and, the connection member.

7. The linear vibration motor of claim 5, wherein the elastic member is a coil spring, and
the coil spring has a large enough diameter to make contact between the movable part and the connection member.

8. The linear vibration motor of claim 2, wherein the mass is separated into two parts on the basis of the support plate, and
a connection member is connected and fixed at the top or bottom of the mass, and the movable part is arranged on the connection member.

9. The linear vibration motor of claim 1, wherein the movable part comprises:
magnets generating magnetic flux; and
a yoke collecting the magnetic flux generated from the magnets being arranged on the yoke at predetermined intervals.

10. The linear vibration motor of claim 9, wherein the movable part is arranged above or under the support plate and fixed to the mass, and the coil part is arranged on the top or bottom of the support plate and faces the movable part.

11. The linear vibration motor of claim 1, wherein the support plate comprises non-magnetic materials.

12. The linear vibration motor of claim 1, wherein a flexible substrate is arranged on the support plate so as to supply power to the coil part from an external source.

* * * * *

UNITED STATES PATENT AND TRADEMARK OFFICE
CERTIFICATE OF CORRECTION

| | | |
|---|---|---|
| PATENT NO. | : 8,013,480 B2 | Page 1 of 1 |
| APPLICATION NO. | : 12/588358 | |
| DATED | : September 6, 2011 | |
| INVENTOR(S) | : Je Hyun Bang et al. | |

It is certified that error appears in the above-identified patent and that said Letters Patent is hereby corrected as shown below:

Column 6, Line 51, in claim 6, delete "and," and insert -- and --, therefor.

Signed and Sealed this
Thirty-first Day of January, 2012

David J. Kappos
*Director of the United States Patent and Trademark Office*